(12) United States Patent
Rahman

(10) Patent No.: US 12,301,637 B2
(45) Date of Patent: May 13, 2025

(54) INHIBITING ACTIVE SESSION DROP DURING REGISTRATION EXPIRATION IN WIRELESS COMMUNICATION NETWORKS

(71) Applicant: T-MOBILE INNOVATIONS LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/466,233

(22) Filed: Sep. 13, 2023

(65) Prior Publication Data

US 2025/0088548 A1 Mar. 13, 2025

(51) Int. Cl.
*G06F 15/16* (2006.01)
*H04L 65/1016* (2022.01)
*H04L 65/1069* (2022.01)
*H04L 65/1073* (2022.01)

(52) U.S. Cl.
CPC ...... *H04L 65/1073* (2013.01); *H04L 65/1016* (2013.01); *H04L 65/1069* (2013.01)

(58) Field of Classification Search
CPC ............. H04L 65/1016; H04L 65/1069; H04L 65/1073
USPC ........................................................ 709/227
See application file for complete search history.

(56) References Cited

U.S. PATENT DOCUMENTS

| | | | |
|---|---|---|---|
| 7,395,336 B1 * | 7/2008 | Santharam | H04L 67/143 709/227 |
| 8,195,158 B2 | 6/2012 | Regnier et al. | |
| 9,537,796 B2 * | 1/2017 | Lisak | H04L 65/1095 |
| 9,603,070 B2 * | 3/2017 | Jun | H04L 65/1016 |
| 9,866,434 B2 * | 1/2018 | Martinez Perea | H04L 65/1073 |
| 10,194,383 B2 | 1/2019 | Cili et al. | |
| 10,485,050 B2 | 11/2019 | Chinthalapudi et al. | |
| 10,805,973 B2 * | 10/2020 | Babu | H04W 76/11 |
| 10,912,054 B2 * | 2/2021 | Venkataraman | H04W 60/06 |
| 11,064,383 B2 | 7/2021 | Karri et al. | |
| 11,178,589 B2 * | 11/2021 | Park | H04W 28/0247 |
| 11,197,230 B2 * | 12/2021 | Jain | H04W 48/16 |
| 11,259,354 B2 * | 2/2022 | Babu | H04L 41/0816 |
| 11,457,403 B2 * | 9/2022 | Kim | H04W 76/18 |
| 11,528,679 B2 * | 12/2022 | Venkataraman | H04W 88/06 |

(Continued)

*Primary Examiner* — Moustafa M Meky

(57) ABSTRACT

Various embodiments comprise a wireless communication network to inhibit multimedia session drop. In some examples, the wireless communication network comprises Call Session Control Function (CSCF) circuitry. The CSCF circuitry receives a multimedia registration request from a user device that comprises a registration timer indication. The CSCF circuitry registers the user device for multimedia services and sets a registration timer based on the registration timer indication. The CSCF circuitry receives a multimedia session request from the user device and establishes a multimedia session based on the session request. The CSCF circuitry determines when the registration timer expires and when the multimedia session is active. When the registration timer expires and the multimedia session is active, the CSCF circuitry maintains the registration of the user device. When the registration timer expires and the multimedia session is inactive, the CSCF circuitry deregisters the user device.

20 Claims, 9 Drawing Sheets

(56) References Cited

U.S. PATENT DOCUMENTS

| | | | |
|---|---|---|---|
| 11,528,770 B2* | 12/2022 | Shu | H04W 76/10 |
| 11,877,228 B2* | 1/2024 | Jain | H04W 8/22 |
| 2018/0152485 A1 | 5/2018 | Chen et al. | |
| 2023/0007054 A1 | 1/2023 | Huang et al. | |

* cited by examiner

INHIBITING ACTIVE SESSION DROP DURING REGISTRATION EXPIRATION IN WIRELESS COMMUNICATION NETWORKS

TECHNICAL FIELD

Various embodiments of the present technology relate to Internet Protocol Multimedia Subsystem (IMS), and more specifically, to using inhibiting deregistration in response to registration timer expiration.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

Internet Protocol Multimedia Subsystem (IMS) supports Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises IMS functions and elements like Call Session Control Function (CSCF) and Telephony Application Server (TAS).

To receive services provided by IMS (e.g., video calling), a wireless user device first registers with the IMS. To register, the user device transfers an IMS registration request to the IMS. The IMS exchanges signaling with the user device and with the core network to authenticate the identity of the user device and to authorize the user device for IMS service. Upon successful authentication and authorization, the IMS registers the user device.

IMS registrations are only valid for a period of time. When the user device initiates IMS registration, the user device includes a time request in the IMS registration request that specifies how long the registration is to remain active. In response to a successful registration, the IMS sets a registration timer based on the time request. The timer typically lasts between one to two hours and species how long the user device's registration is to remain active. If the IMS does not receive a registration refresh request prior to the expiration of the registration timer, the IMS deregisters the user device. User devices often forget to transfer registration refresh requests when participating in multimedia sessions (e.g., a voice call). Even when the user device successfully transfers a registration refresh request, the refresh request may not be successfully delivered to the IMS as the signaling pathway between the IMS and the user device can be complex. The resulting unintended IMS deregistration negatively impacts the user experience.

Unfortunately, wireless communication networks do not effectively or efficiently maintain multimedia sessions in response to registration timer expiration.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for Internet Protocol Multimedia Subsystem (IMS) multimedia sessions. Some embodiments comprise a method of operating a wireless communication network to inhibit multimedia session drop. The method comprises receiving a multimedia registration request from a user device that comprises a registration timer indication. The method further comprises registering the user device for multimedia services and setting a registration timer based on the registration timer indication. The method further comprises receiving a multimedia session request from the user device and establishing a multimedia session based on the session request. The method further comprises determining when the registration timer expires and when the multimedia session is active. When the registration timer expires and the multimedia session is active, the method further comprises maintaining the registration of the user device. When the registration timer expires and the multimedia session is inactive, the method further comprises deregistering the user device.

Some embodiments comprise a wireless communication network to inhibit multimedia session drop. The wireless communication network comprises Call Session Control Function (CSCF) circuitry. The CSCF circuitry receives a multimedia registration request from a user device that comprises a registration timer indication. The CSCF circuitry registers the user device for multimedia services and sets a registration timer based on the registration timer indication. The CSCF circuitry receives a multimedia session request from the user device and establishes a multimedia session based on the session request. The CSCF circuitry determines when the registration timer expires and when the multimedia session is active. When the registration timer expires and the multimedia session is active, the CSCF circuitry maintains the registration of the user device. When the registration timer expires and the multimedia session is inactive, the CSCF circuitry deregisters the user device.

Some embodiments comprise one or more non-transitory computer-readable storage media having program instructions stored thereon to inhibit multimedia session drop. The program instructions, when executed by a computing system, direct the computing system to perform operations. The operations comprise receiving a multimedia registration request from a user device that comprises a registration timer indication. The operations further comprise registering the user device for multimedia services and setting a registration timer based on the registration timer indication. The operations further comprise receiving a multimedia session request from the user device and establishing a multimedia session based on the session request. The operations further comprise determining when the registration timer expires and when the multimedia session is active. When the registration timer expires and the multimedia session is active, the operations further comprise maintaining the registration of the user device. When the registration timer expires and the multimedia session is inactive, the operations further comprise deregistering the user device.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
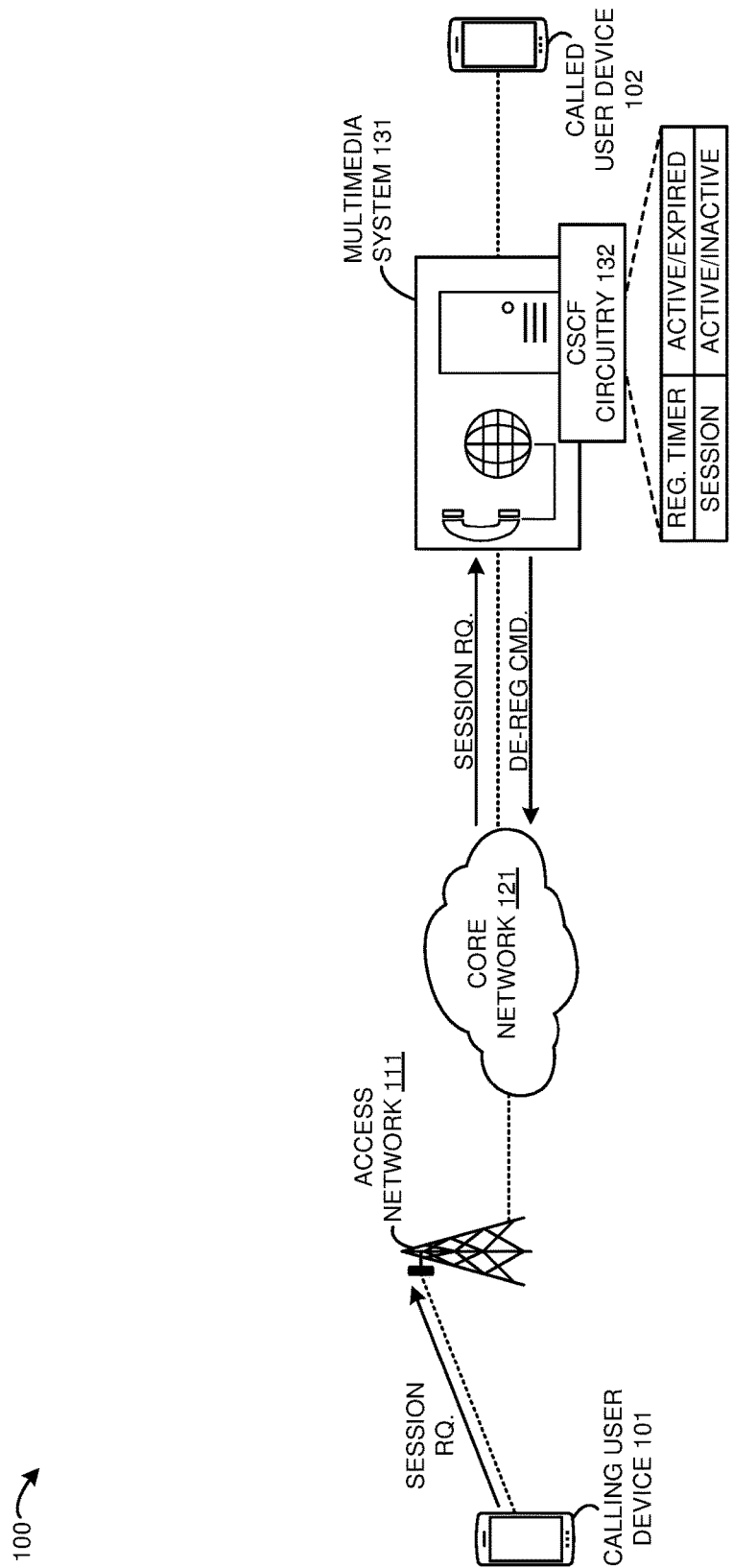
FIG. 1 illustrates a wireless communication network to inhibit multimedia session drop in response to registration timer expiration.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to inhibit multimedia session drop in response to registration timer expiration. Wireless communication network 100 delivers services like voice calling, video calling, instant messaging, internet-access, media-streaming, machine communications, or some other wireless communications product to user devices. Wireless communication network 100 comprises calling user device 101, access network 111, core network 121, multimedia system 131, and called user device 102. Multimedia system 131 comprises Call Session Control Function (CSCF) circuitry 132. In other examples, wireless network communication network 100 may comprise additional or different elements than those illustrated in FIG. 1.

Various examples of network operation and configuration are described herein. In some examples, calling user device 101 registers with multimedia system 131 over access network 111 and core network 121. During registration user device 101 transfers a registration request that comprises a registration time indication to multimedia system 131. The registration time indication selects a period of time for which the registration will remain active. For example, user device 101 may include a registration time indication of 7,200 seconds in the registration request. CSCF circuitry 132 receives the registration request and sets a registration timer based on the time indication.

Once registered, calling user device 101 transfers a multimedia session request (RQ.) to multimedia system 131 over access network 111 and core network 121. The session request is addressed for called user device 102 and requests a multimedia session be set up between the user devices. Exemplary multimedia session requests include voice calls, video calls, instant messaging sessions, and the like. CSCF circuitry 132 processes the session request and organizes the communication links between calling user device 101 and called user device 102. Calling user device 101 begins the session and exchanges data with called user device 102. As illustrated in FIG. 1, CSCF circuitry 132 maintains a table to track the expiration status of the registration timer and whether device 101 is participating in any active multimedia sessions. When the registration timer expires, CSCF circuitry 132 accesses the table to determine if calling user device 101 is participating in any active media sessions. If user device 101 is not participating in an active multimedia session, CSCF circuitry 132 transfers a deregistration command to device 101 over core network 121 and access network 111. If user device 101 is participating in an active multimedia session, CSCF circuitry 132 does not deregister device 101 and monitors for the session termination. When the session terminates, transfers a deregistration command to device 101 over core network 121 and access network 111.

Calling user device 101 and called user device 102 are representative of wireless user devices. Exemplary user devices include phones, computers, vehicles, robots, sensors, and/or other devices with wireless communication capabilities. Access network 111 exchanges wireless signals with user device 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise a wireless access point, a Radio Access Networks (RAN), internet backbone providers, edge computing systems, or other types of wireless/wireline access systems to provide wireless links to user device 101, the backhaul links, and edge computing services between user device 101 and core network 121.

Access network 111 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUS handle higher wireless network layers like the Radio Resource Control (RRC), Service Data Adaption Protocol (SDAP), and Packet Data Convergence Protocol (PDCP). The CUs are coupled to network functions in core network 121.

Core network 121 and multimedia system 131 are representative of computing systems that provide wireless data services to user device 101 over access network 111. Exemplary computing systems comprise data centers, server farms, cloud computing networks, hybrid cloud networks, and the like. The computing systems of core network 121 store and execute the network functions to provide wireless data services to originating UE 101 over access network 111. Exemplary network functions include Access and Mobility Management Function (AMF), Mobility Management Entity (MME), Session Management Function (SMF), User Plane Function (UPF), Packet Gateway (P-GW), Serving Gateway (S-GW), Policy Control Function (PCF), Policy Rules and Charging Function (PCRF), and Unified Data Management (UDM). Core network 121 may comprise a Fifth Generation Core (5GC) architecture and/or an Evolved Packet Core (EPC) architecture. The AMF, MME, SMF, PCRF, PCF, and UDM comprise control plane elements to handle signaling between the user device and network core while the UPF, P-GW, and S-GW comprise user plane elements to handle data exchange between the user device and network core. In examples where core network 121 comprises EPC architecture, the control plane circuitry may comprise functions like MME and PCRF, the user plane circuitry may comprise functions like P-GW and S-GW. In examples where core network 121 comprises 5GC architecture, the control plane circuitry may comprise functions like AMF, SMF, PCF, and UDM, the user plane circuitry may comprise functions like UPF.

The computing systems of multimedia system 131 store and execute multimedia functions (e.g., CSCF circuitry 132) to provide services like voice calling, video conferencing, and text messaging to user device 101. Exemplary multimedia functions include CSCF, Telephony Application Server (TAS), and Rich Communication Service Application Server (RCS AS). Multimedia system 131 may comprise an Internet Protocol Multimedia Subsystem (IMS) core architecture. For example, multimedia system 131 may receive text messages or voice call requests sent by calling user device 101 and route the text messages and voice call requests to their respective message destinations.

Figure 2:
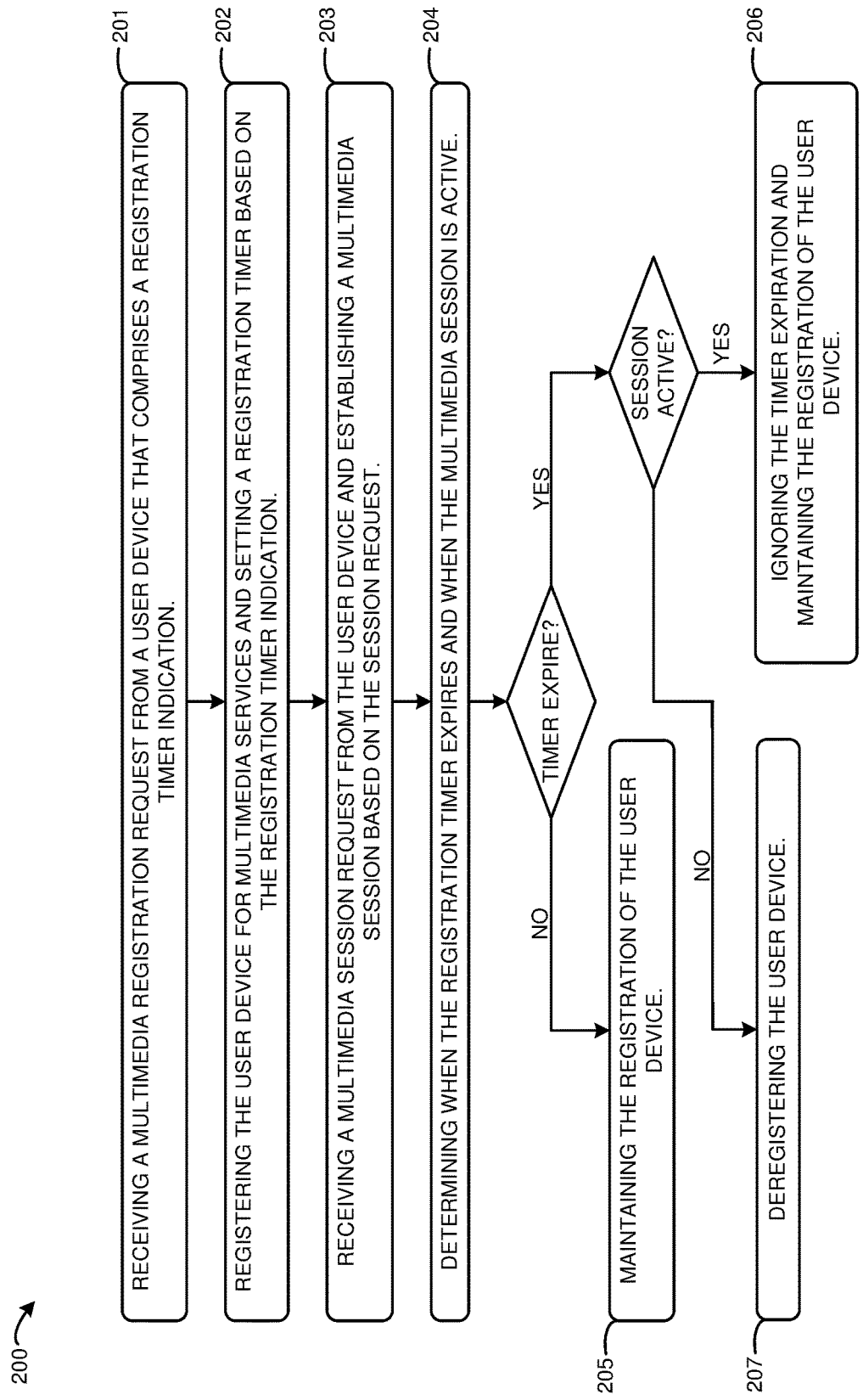
FIG. 2 illustrates an exemplary operation of the wireless communication network to inhibit multimedia session drop in response to registration timer expiration.

FIG. 2 illustrates process 200. Process 200 comprises an exemplary operation of wireless communication network 100 to inhibit multimedia session drop in response to registration timer expiration. The operation may vary in other examples. The operations of process 200 comprise receiving a multimedia registration request from a user device that comprises a registration timer indication (step 201). The operations further comprise registering the user device for multimedia services and setting a registration timer based on the registration timer indication (step 202). The operations further comprise receiving a multimedia session request form the user device and establishing a multimedia session based on the session request (step 203). The operations further comprise determining when the registration timer expires and when the multimedia session is active (step 204). If the timer has not expired, the operations proceed by maintaining the registration of the user device (step 205). If the timer has expired and the session is active, the operations proceed by ignoring the timer expiration and maintaining the registration of the user device (step 206). If the timer has expired and the session is inactive, the operations proceed by deregistering the user device (step 207).

Figure 3:
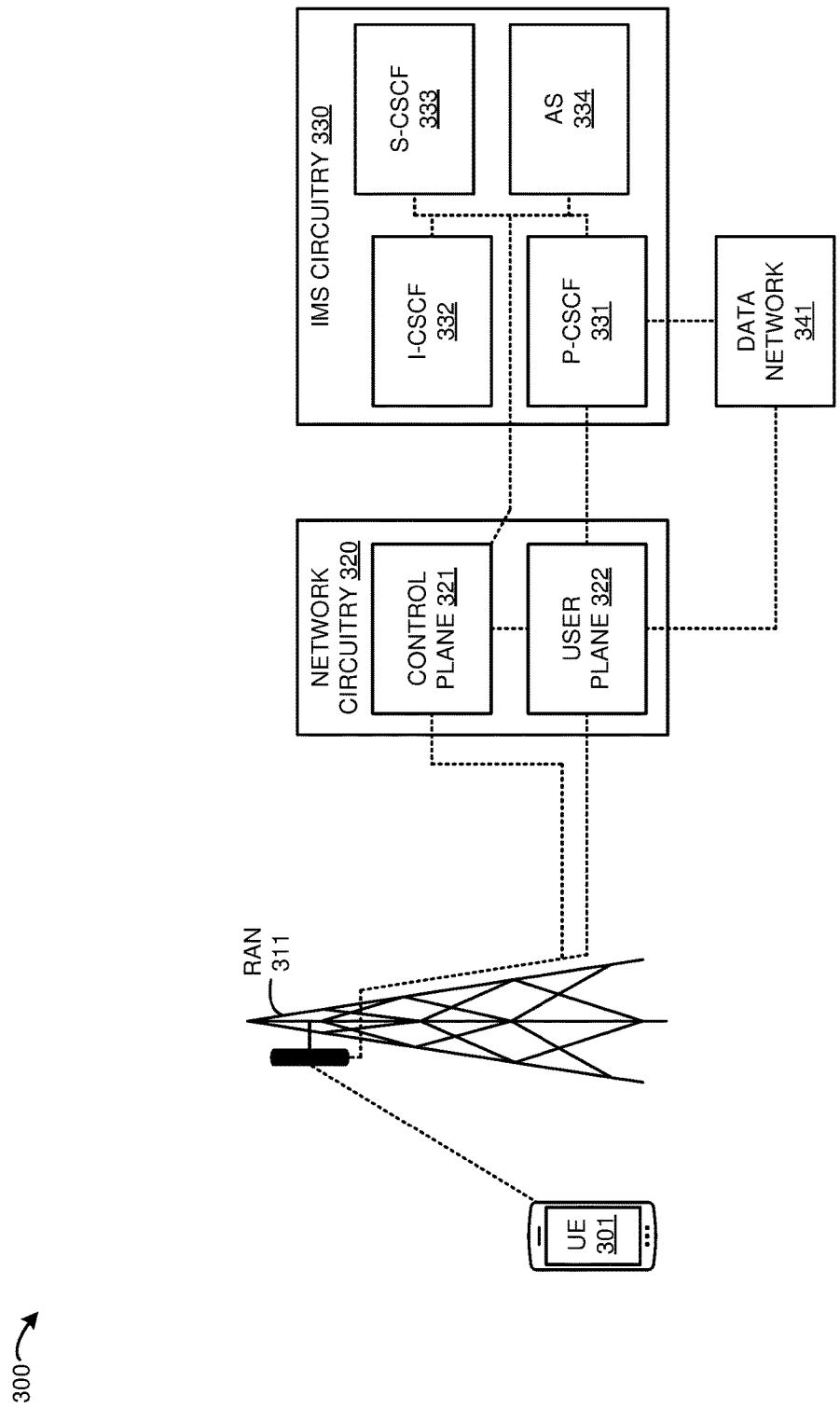
FIG. 3 illustrates a wireless communication network to inhibit multimedia session drop in response to registration timer expiration.

FIG. 3 illustrates wireless communication network 300 network to inhibit multimedia session drop in response to registration timer expiration. Wireless communication network 300 is an example of wireless network 100, however network 100 may differ. Wireless communication network 300 comprises User Equipment (UE) 301, RAN 311, network circuitry 320, IMS circuitry 330, and data network 341. Network circuitry 320 comprises control plane 321 and user plane 322. IMS circuitry 330 comprises Proxy-CSCF (P-CSCF) 331, Interrogating-CSCF (I-CSCF) 332, Serving-CSCF (S-CSCF) 333, and Application Server (AS) 334. In other examples, wireless network 300 may comprise additional or different elements than those illustrated in FIG. 3.

In some examples, UE 301 wirelessly attaches to RAN 311 and registers for network services with control plane 321. Once registered on network circuitry 320, UE 301 transfers an IMS registration request to P-CSCF 331 over RAN 311 and user plane 322. The registration request includes a time indication for how long the registration should remain active before requiring a refresh. P-CSCF 331 notifies I-CSCF 332 of the registration which in turn notifies S-CSCF 333. S-CSCF 333 interacts with I-CSCF 332, P-CSCF 331, and control plane 321 to register UE 301 for IMS services. Upon registration, P-CSCF 331 and S-CSCF 333 set registration timers for UE 301 based on the time indication included in the IMS registration request. The registration may last for the time specified in the time indication or may last a different amount of time. P-CSCF 331 and S-CSCF 333 also track when UE 301 is participating in an active media session. For example, P-CSCF 331 and S-CSCF 333 may maintain context for UE 301 to track the registration timer and the session status of UE 301.

Once registration is complete, P-CSCF 331 receives a session request transferred by UE 301 for a multimedia session over data network 341. P-CSCF 331 interfaces with I-CSCF 332 and S-CSCF 333 to establish the multimedia session. P-CSCF 331 transfers a request to control plane 321 to reserve communication (e.g., radio) resources for UE 301 and interfaces with the other IMS functions to establish the multimedia session for UE 301. S-CSCF 333 organizes the end-to-end communication link between UE 301 and data network 341. During the session, P-CSCF 331 and S-CSCF 333 detect the expiration of the registration timer. Before force deregistering UE 301, P-CSCF 331 and S-CSCF 333 check to see if UE 301 is participating in an active multimedia session. For example, P-CSCF 331 and S-CSCF 333 may access the context for UE 301 to track the status of the registration timer and whether UE 301 is in an active multimedia session (e.g., a voice call). Since the session for UE 301 is active, P-CSCF 331 and S-CSCF 333 do not deregister UE 301 is response to the expiration of the registration timer. P-CSCF 331 and S-CSCF 333 continue to monitor the status of the multimedia session for UE 301. When the session ends (e.g., UE 301 ends the voice call), S-CSCF 333 deregisters UE 301 for IMS services and directs P-CSCF 331 to transfer a deregistration command to UE 301. P-CSCF 331 transfers the deregistration command to UE 301 over control plane 321 and RAN 311. UE 301 receives the command and deregisters for IMS services.

Advantageously, wireless communication network 300 effectively maintains multimedia sessions over default radio bearers in in response to registration timer expiration. Moreover, P-CSCF 331 and S-CSCF 333 efficiently track UE session status in concert with registration timer status to inhibit premature multimedia session drop.

UE 301 and RAN 311 communicate over links using wireless technologies like 5GNR, LTE, LP-WAN, WIFI, Bluetooth, and/or some other type of wireless networking protocol. The wireless technologies use electromagnetic frequencies in the low-band, mid-band, high-band, or some other portion of the electromagnetic spectrum. RAN 311, network circuitry 320, IMS circuitry 330, and data network 341 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, interprocessor communication, bus interfaces, and/or some other data communication protocols.

UE 301 may comprise a phone, vehicle, computer, sensor, drone, robot, or another type of data appliance with wireless communication circuitry. Although RAN 311 is illustrated as a tower, RAN 311 may comprise another type of mounting structure (e.g., a building), or no mounting structure at all. RAN 311 comprises a Fifth Generation (5G) RAN, LTE RAN, gNodeB, eNodeB, NB-IoT access node, LP-WAN base station, wireless relay, WIFI hotspot, Bluetooth access node, and/or another wireless or wireline network transceiver. UE 301 and RAN 311 comprise antennas, amplifiers, filters, modulation, analog/digital interfaces, microprocessors, software, memories, transceivers, bus circuitry, and the like. Control plane 321 comprises network functions like AMF, MME, SMF, PCF, PCRF, UDM, and the like. User plane 322 comprises network functions like UPF, edge UPF, P-GW, S-GW, and the like.

UE 301, RAN 311, network circuitry 320, IMS circuitry 330, and data network 341 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
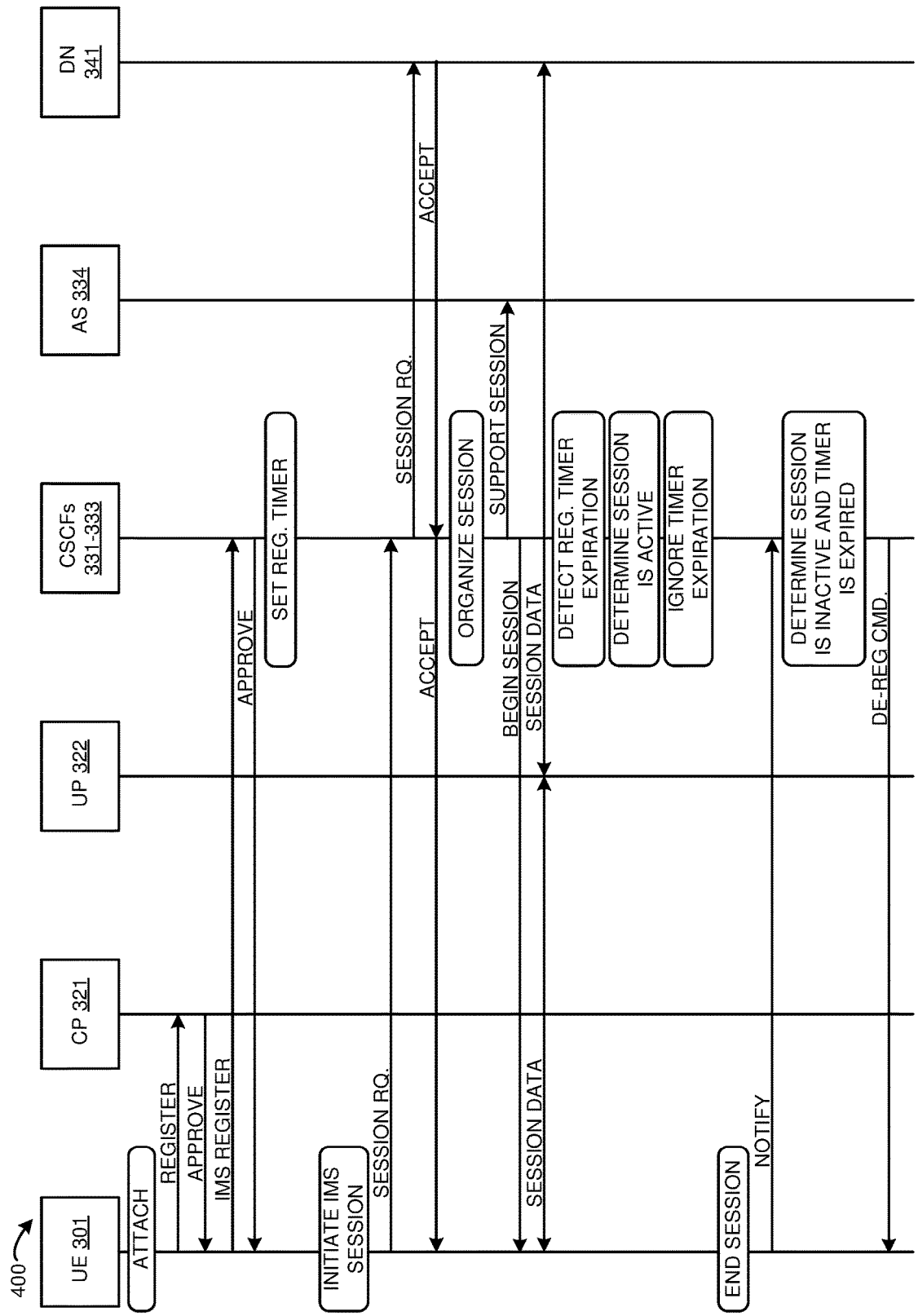
FIG. 4 illustrates an exemplary operation of the wireless communication network to inhibit multimedia session drop in response to registration timer expiration.

FIG. 4 illustrates process 400. Process 400 comprises an exemplary operation of wireless communication network 300 to inhibit multimedia session drop in response to registration timer expiration. Process 400 is an example of process 200 illustrated in FIG. 2, however process 200 may differ. In some examples, UE 301 attaches to RAN 311 and wirelessly transfers a registration request to control plane (CP) 321 over the default bearer and RAN 311. Control plane 321 processes the registration request to authenticate the identity of UE 301 and determine what services UE 301 is authorized for. Control plane 321 registers UE 301 and transfers a registration approval message to UE 301 over RAN 311.

Once registered with network circuitry 320, UE 301 transfers an IMS registration request to P-CSCF 331 to register for IMS services like voice calling. The IMS registration request also includes a registration time request that specifies how long the registration should remain active before refresh is required. P-CSCF 331 forwards the registration request to S-CSCF 333 which interfaces with the other IMS functions and control plane 321 to register UE 301 for IMS services. S-CSCF 333 indicates the successful registration to P-CSCF 331 and sets a registration timer (REG. TIMER) for UE 301 based on the registration request. P-CSCF 331 transfers a registration approval message to UE 301 and also sets the registration timer for UE 301. For example, P-CSCF 331 and S-CSCF 333 may maintain UE context for UE 301 that tracks the registration timer for UE 301 and whether UE 301 is participating in any active media sessions.

Once registered for IMS services, UE 301 initiates an IMS voice session by generating an IMS session request. For example, UE 301 may generate and transfer a Mobile Originating Session Initiation Protocol (MO SIP) invite to initiate a voice call with a user in data network 341. UE 301 transfers the voice session request (SESSION RQ.) to RAN 311 which forwards the session request to P-CSCF 331 over user plane (UP) 322. P-CSCF 331 interfaces with I-CSCF 332 and S-CSCF 333 to route the session request to the intended destination. For example, S-CSCF 333 may map a publicly available Uniform Resource Indicator (URI) or phone number for the destination included in the session request to a registered Internet Protocol (IP) address for the destination and transfer the session request based on the registered IP address. In this example, S-CSCF 333 determines the destination is in data network 341 and drives P-CSCF 331 to transfer the session request to data network 341. P-CSCF 331 receives a session accept message from data network 341 and indicates the acceptance to S-CSCF 333. S-CSCF 333 interfaces with AS 334 to support the voice session and directs user plane 322 and UE 301 to begin the session. The session command comprises information like routing data to instruct user plane 322 and UE 301 where to transfer the session data. In response to the session command, UE 301 exchanges user data for the voice session over the default bearer and RAN 311 with user plane 322. User plane 322 exchanges the user data with data network 341. S-CSCF 333 and AS 334 monitor the session to control the flow of user data.

During the voice session, P-CSCF 331 and S-CSCF 333 detect the expiration of the registration timer for UE 301. For example, during the voice call, an error may occur in the device circuitry of UE 301 causing UE 301 to "forget" to transfer a registration refresh request to IMS 330 before the expiration of the registration timer. It should be appreciated that the computing resources available in user devices are often limited and the intense data/signaling load of a voice call may cause the user device to fail to detect IMS registration expiration is imminent. Alternatively, UE 301 may transfer a registration refresh request during the voice call, but an error may occur in RAN 311 and/or network circuitry 320 that prevents the registration refresh request from being delivered to IMS 330. It should be appreciated that the transport network between user devices and IMS is complex and may comprise a number of geographically disparate nodes. This complexity increases the likelihood of errors occurring in the transport network that prevent timely message delivery or prevent message delivery altogether.

Before force deregistering UE 301, P-CSCF 331 and S-CSCF 333 check if UE 301 is participating in any active media sessions and temporarily maintain the registration status of UE 301. P-CSCF 331 and S-CSCF 333 determine the voice session for UE 301 is active and decide to delay the deregistration of UE 301 until the session is complete. Alternatively, CSCFs 331 and 333 may forgo deregistration if a registration refresh request from UE 301 is received before the voice session ends. For example, P-CSCF 331 and S-CSCF 333 may generate a replica of the UE context of UE 301 in response to the timer expiration and the session for UE 301 being active to maintain UE 301's registration status.

Subsequently, UE 301 ends the voice session and transfers a session end notification to RAN 311 which delivers the notification to P-CSCF 331 over user plane 322. P-CSCF 331 forwards the notification to S-CSCF 333. Since the registration timer has expired and the voice session for UE 301 is over, S-CSCF 333 deregisters UE 301 for IMS services. S-CSCF 333 drives P-CSCF 331 to transfer a deregistration command to UE 301. P-CSCF 331 transfers the deregistration command to UE 301 over user plane 322 and RAN 311. UE 301 receives the command and responsively deregisters from IMS core 330.

Figure 5:
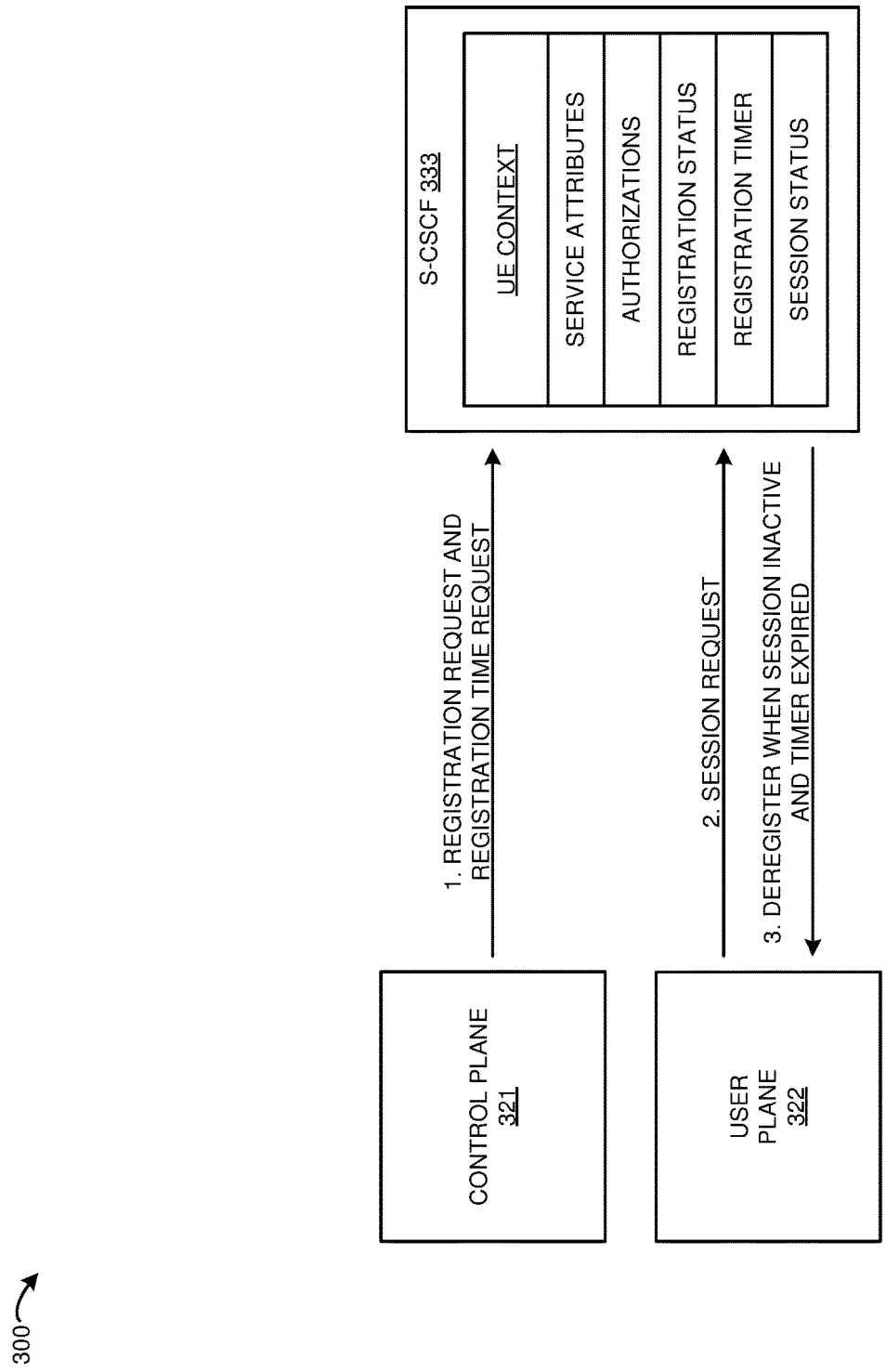
FIG. 5 illustrates a control plane, user plane, and Serving-Call Session Control Function (S-CSCF) in the wireless communication network.

FIG. 5 further illustrates control plane 321, user plane 322, and S-CSCF 333 in wireless communication network 300. S-CSCF 331 hosts the UE context illustrated in FIG. 5 that tracks various metrics for UE 301. The context defines service metrics for UE 301 like service attributes, authorizations, registration status, registration timer, and session status. It should be appreciated that these metrics are exemplary and may differ in other examples. In some examples, S-CSCF 333 receives a registration request for UE via control plane 321. The registration request includes a time request that specifies how long the registration should remain active. Typically, the registration time request will be between one to two hours, however the amount of time may vary in other examples. After a successful registration, S-CSCF 333 (or in some examples P-CSCF 331) forms UE context for UE 301 to define the level of service, authorized services, and the like for UE 301. S-CSCF 333 also sets a registration timer based on the time request included in the registration request.

In response to receiving an IMS session request for UE 301 (e.g., to participate in a voice call, video call, and the like), S-CSCF 333 interacts with the other IMS functions to set up and track the status of the session. In particular, S-CSCF 333 monitors for when UE 301 is participating in an IMS session (e.g., active voice call). When the registration timer for UE 301 expires, S-CSCF 333 checks to see if UE 301 is participating in a multimedia session. When UE 301 is participating in a session, S-CSCF 333 (or in some examples P-CSCF 331) delays forced deregistration and generates a replica of the UE context to preserve UE 301's registration status with IMS 330. When S-CSCF 333 detects that UE 301 is no longer participating in the session (e.g., voice call end), S-CSCF 333 discards the context replica and deregisters UE 301 from IMS 330 and interacts with the other IMS functions to transfer a deregistration command to UE 301. P-CSCF 331 may operate in a manner similar to S-CSCF 333 as described above to detect registration time expiration, track IMS session status, and temporarily maintain UE registration.

Figure 6:
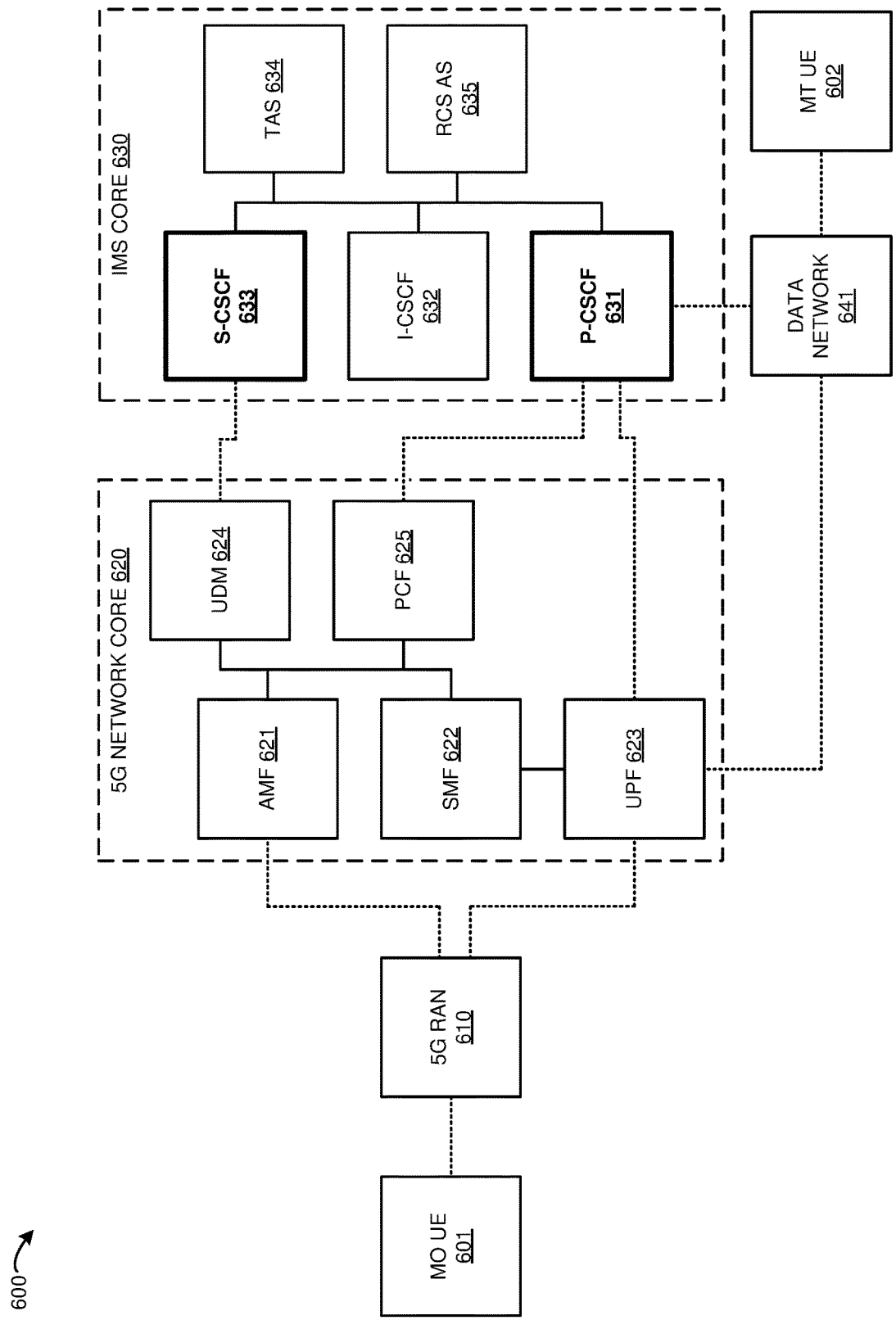
FIG. 6 illustrates a Fifth Generation (5G) wireless communication network to inhibit premature Internet Protocol Multimedia Subsystem (IMS) deregistration in response to registration timer expiration.

FIG. 6 illustrates 5G communication network 600 to inhibit premature Internet Protocol Multimedia Subsystem (IMS) deregistration in response to registration timer expiration. Communication network 600 comprise Mobile Originating User Equipment (MO UE) 601, Mobile Terminating User Equipment (MT UE) 602, RAN 610, 5G network core 620, IMS core 630, and data network 641. 5G network core 620 comprises Access and Mobility Management Function (AMF) 621, Session Management Function (SMF) 622, User Plane Function (UPF) 623, Unified Data Management (UDM) 624, and Policy Control Function (PCF) 625. IMS core 630 comprises Proxy Call Session Control Function (P-CSCF) 631, Interrogating Call Session Control Function (I-CSCF) 632, Serving Call Session Control Function (S-CSCF) 633, Telephony Application Server (TAS) 634, and Rich Communication Services Application Server (RCS AS) 635. Other network functions and network elements like Authentication Server Function (AUSF), Network Slice Selection Function (NSSF), Short Message Service Function (SMSF), Unified Data Registry (UDR), Network Exposure Function (NEF), Network Repository Function (NRF), and Application Function (AF) are typically present in 5G network core 620 but are omitted for clarity. Other IMS functions and IMS elements like Breakout Gateway Control Function (BGCF), Multimedia Resource Function (MRF), Media Gateway Control Function (MGCF), E.164 Number Mapping (ENUM), Home Subscriber Server (HSS), and Interconnecting Border Control Function (IBCF) are typically present in IMS core 630 but are omitted for clarity. In other examples, wireless network communication network 600 may comprise additional or different elements than those illustrated in FIG. 6.

In some examples, UE 601 wirelessly attaches to RAN 610. UE 601 exchanges attachment signaling with RAN 610 to establish a default signaling radio bearer with 5G network applications hosted by RAN 610. UE 601 uses the default signaling bearer to secure additional radio resources to receive wireless voice and data services from network core 620. UE 601 transfers a registration request over the default signaling bearer to RAN 610. The registration request includes information like a registration type, UE capabilities, requested slice types, Protocol Data Unit (PDU) session requests, and the like. RAN 610 forwards the registration request for UE 601 to AMF 621. In response to the registration request, AMF 621 transfers an identity request to UE 601 over RAN 610. UE 601 indicates its identity to RAN 610 over the default signaling radio bearer. RAN 610 forwards the identity indication to AMF 621. AMF 621 interacts with other network functions to authenticate the identity of UE 601 and authorize UE 601 for wireless data service. For example, AMF 621 may interface with an AUSF and retrieve authentication vectors from UDM 624 to authenticate the identity of UE 601.

Responsive to the authentication and authorization, AMF 621 selects UDM 624 to generate UE context for UE 601. AMF 621 retrieves Quality-of-Service (QOS) metrics, allowed slice identifiers, service attributes, and the like from UDM 624. AMF 621 generates UE context comprising the information retrieved from UDM 624. AMF 621 selects PCF 625 to create a network policy association for UE 601. PCF 625 transfers network policy information for UE 601 to AMF 621 and registers for event reporting from AFM 621 like registration state change events. AMF 621 interfaces with other network functions to select a network slice for UE 601. For example, AMF 621 may interface with an NSSF to select a slice ID for UE 601 based on the service attributes retrieved from UDM 624 and/or slice selection criteria received from UE 601. AMF 621 selects SMF 622 to serve UE 601 based on the slice ID, QOS metrics, requested PDU sessions, service attributes, and/or other data retrieved UDM 624 or received in the registration request from UE 601. SMF 622 selects P-CSCF 631 and UPF 623 based on the service information provided by the one of UDM 624. SMF 622 indicates the network addresses for UPF 623 and P-CSCF 631 to AMF 621. AMF 621 includes the network addresses in the UE context AMF 621 transfers the UE context for UE 601 to RAN 610. RAN 610 wirelessly transfers the UE context to UE 601 over the default radio signaling bearer. UE 601 uses the UE context to establish a default radio data bearer with RAN 610 and exchanges user data for UE 601's active PDU sessions with RAN 610 over the default radio data bearer. RAN 610 exchanges the user data with UPF 623.

UE 601 generates an IMS registration request to register for IMS services like voice calling from IMS 630. The IMS registration request specifies a registration time period. UE 601 addresses the registration request for P-CSCF 631 and transfers the IMS registration request to RAN 610. RAN 610 forwards the IMS registration request to UPF 623. UPF 623 reads the network address for P-CSCF 631 in the IMS registration request and forwards the request to P-CSCF 631. P-CSCF 631 performs a DNS query to determine the network address for I-CSCF 632 and forwards the registration request to I-CSCF 632. I-CSCF 632 interfaces with UDM 624 to identify and select S-CSCF 633. I-CSCF 632 forwards the IMS registration request to S-CSCF 633. S-CSCF 633 exchanges authentication signaling with UE 601 and UDM 624 to authenticate and authorize UE 601 for IMS services. For example, UDM 624 may access the subscriber profile for UE 601 to determine if UE 601 qualifies for IMS service and may indicate the qualification to S-CSCF 633. Upon authentication and authorization, S-CSCF 633 registers UE 601 for IMS service and sets a registration timer for UE 601 based on the time indication included in the initial IMS registration request. S-CSCF 633 notifies P-CSCF 631 which transfers a registration accept message to UE 601 over UPF 623 and RAN 610. P-CSCF 631 also tracks the registration timer for UE 601.

Once registered with IMS core 630, UE 601 initiates a MO IMS voice session with MT UE 602. MO UE 601 generates a MO SIP invite message that includes the public URI for MT UE 602. For example, the public URI may comprise the phone number for MT UE 602. UE 601 transfers the SIP invite to RAN 610 over the default radio data bearer. RAN 610 forwards the SIP invite to UPF 623 which delivers the SIP invite message to P-CSCF 631. P-CSCF 631 receives the SIP invite and forwards the invite to S-CSCF 633. S-CSCF 633 receives the SIP invite and notifies TAS 634 of the requested voice session. S-CSCF 633 translates the URI for MT UE 602 included into the IP address for MT UE 602 registered with IMS 630. S-CSCF 633 replaces the URI for MT UE 602 with the IP address in the SIP invite. S-CSCF 633 identifies that the IP address for MT UE 602 was registered with P-CSCF 631. S-CSCF 633 returns the SIP invite to P-CSCF 631 based on the registration for MT UE 602 and directs P-CSCF 631 to deliver the SIP invite to MT UE 602. P-CSCF 631 transfers the SIP invite for delivery to MT UE 602 over data network 641.

MT UE 602 accepts the MO SIP invite to participate in a voice call with MO UE 601. MT UE 602 indicates the acceptance to P-CSCF 631 which notifies S-CSCF 633. S-CSCF 633 indicates the acceptance to MO UE 601 over P-CSCF 631, UPF 623, and RAN 610. S-CSCF 633 directs TAS 634 to support the voice session and directs P-CSCF 631 to secure the wireless resources to carry the data for the voice session. P-CSCF 631 transfers a dedicated bearer request to secure the radio resources for the voice session over an N5 interface to PCF 625. PCF 625 receives the request and directs AMF 621 to create a dedicated bearer for the voice call. AMF 621 interfaces with RAN 610 to create the dedicated data radio bearer for the voice call. AMF 621 indicates that the bearer setup is complete to PCF 625 which notifies P-CSCF 631 over their N5 interface. P-CSCF 631 informs S-CSCF 633 that bearer setup is complete.

S-CSCF 633 interfaces with data network 641 and UPF 623 over P-CSCF 631 to establish and end-to-end Realtime Transport Protocol (RTP) connection between MO UE 601 and MT UE 602 to carry the voice data for the session. S-CSCF 633 transfers an indication for MO UE 601 that the voice session may begin to P-CSCF 631. P-CSCF 631 delivers the indication to MO UE 601 over UPF 623 and RAN 610. S-CSCF 633 transfers another indication for MT UE 602 that the voice session may begin to P-CSCF 631. P-CSCF 631 delivers the indication to MT UE 602 over data network 641. In response to the indication, MT UE 602 rings its user to notify them of the requested voice call. When the user of MT UE 602 answers the call, MT UE 602 transfers an answer indication to P-CSCF 631 which forwards the answer indication to MO UE 601 over UPF 623 and RAN 610. MO UE 601 acknowledges the answer indication to MT UE 602 to signify that the voice call may enter conversation mode.

MT UE 602 generates and transfers user data for the voice session to data network 641. Data network 641 transfers user data to UPF 623. UPF 623 transfers the user data to RAN 610. RAN 610 wirelessly delivers the downlink user data to MO UE 601. MO UE 601 generates additional user data and transfers the additional user data as uplink to RAN 610. RAN 610 transfers the additional user data to UPF 623. UPF 623 routes the additional user data to data network 641 which delivers the user data to MT UE 602.

During the IMS voice call between MO UE 601 and MT UE 602, an error occurs in UE 601 and UE 601 fails to detect that the registration timer expiration is imminent. As a result, UE 601 does not transfer a registration refresh request to IMS core 630 and the registration timer expires. S-CSCF 633 and P-CSCF 631 detect the expiration of the registration timer for UE 601. Prior to initiating a forced deregistration, S-CSCF 633 determines if UE 601 is participating in an active IMS session. Since UE 601 is in a voice call with UE 602, S-CSCF 633 decides to temporarily maintain the registration status of UE 601 and informs P-CSCF 631. P-CSCF 631 copies the previous session context for UE 601 to preserve UE 601's IMS registration.

Subsequently, UE 601 (or UE 602) ends the IMS voice call and transfers a call end notification to UPF 623 over 5G RAN 610. UPF 623 delivers the notification to P-CSCF 631 which forwards the notification to S-CSCF 633. S-CSCF 633 determines that UE 601 is no longer participating in an IMS session and that the IMS registration for UE 601 is expired. In response, S-CSCF 633 clears UE 601's IMS context to deregister UE 630 and directs P-CSCF 631 to deregister UE 631. P-CSCF 631 discards the replica of the UE IMS context and transfers a deregistration command to UE 601 over UPF 623 and RAN 610. UE 601 receives the command and responsively deregisters from IMS 630.

Figure 7:
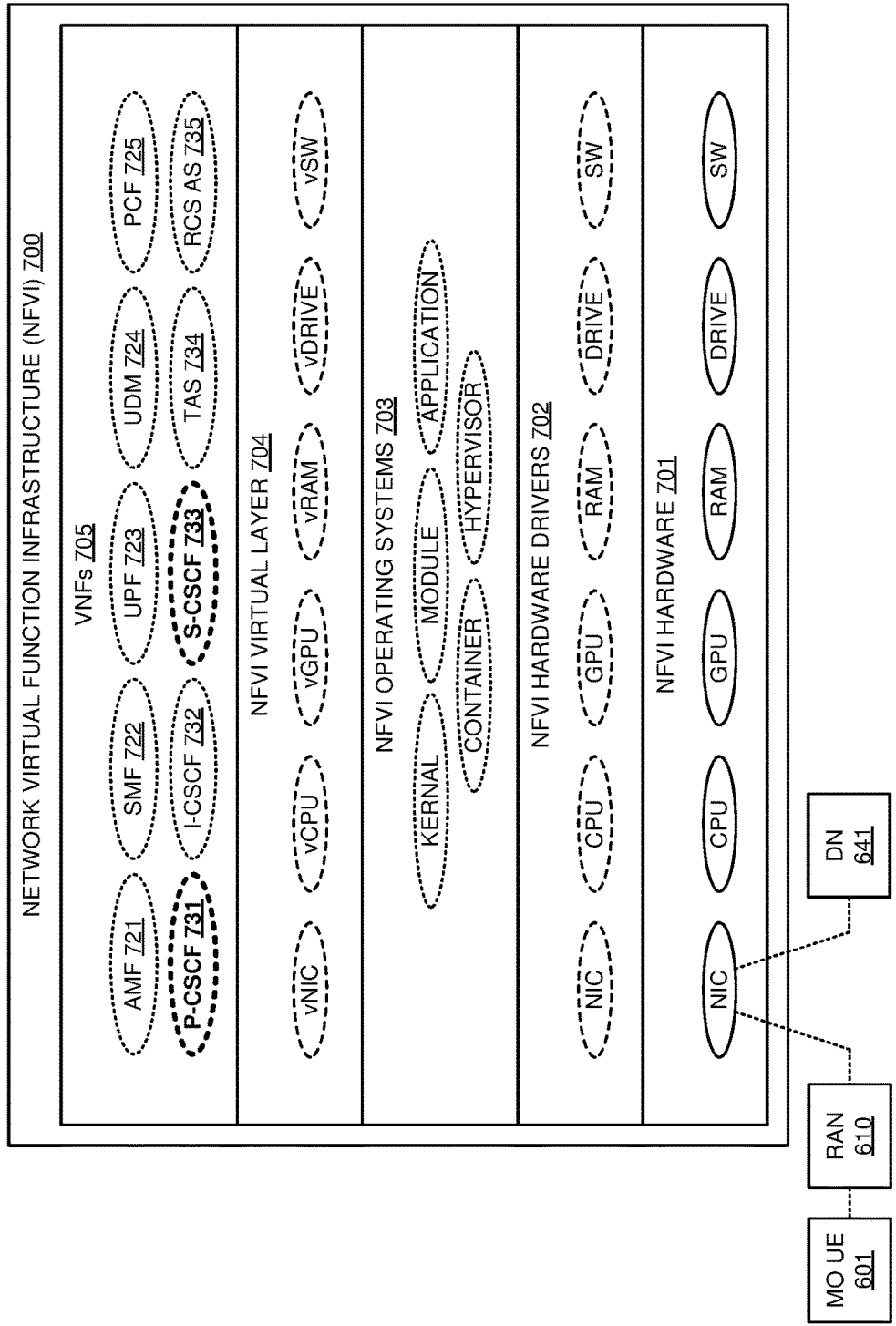
FIG. 7 illustrates a Network Function Virtualization Infrastructure (NFVI) in the 5G wireless communication network.

FIG. 7 illustrates Network Function Virtualization Infrastructure (NFVI) 700. NFVI 700 comprises an example of core network 121 and multimedia system 131 illustrated in FIG. 1 and network circuitry 320 and IMS circuitry 330 illustrated in FIG. 3, although core network 121, multimedia system 131, network circuitry 320, and IMS circuitry 330 may differ. NFVI 700 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, GPU, RAM, Flash/Disk Drives (DRIVE), and Data Switches (SW). NFVI hardware drivers 702 comprise software that is resident in the NIC, CPU, GPU, RAM, DRIVE, and SW. NFVI operating systems 703 comprise kernels, modules, applications, containers, hypervisors, and the like. NFVI virtual layer 704 comprises vNIC, vCPU, vGPU, vRAM, vDRIVE, and vSW. NFVI VNFs 705 comprise AMF 721, SMF 722, UPF 723, UDM 724, PCF 725, P-CSCF 731, I-CSCF 732, S-CSCF 733, TAS 734, and RCS AS 735. Additional VNFs and network elements like AUSF, NSSF, NEF, NRF, AF, UDR, BGCF, MRF, MGCF, ENUM, HSS, and IBCF are typically present but are omitted for clarity. NFVI 700 may be located at a single site or be distributed across multiple geographic locations. For example, a first portion of NFVI 700 may be located at a first geographic location dedicated to the network functions in 5G network core 620 while a second portion of NFVI 700 may be located at a second geographic location dedicated to the IMS functions in IMS core 630. The NIC in NFVI hardware 701 is coupled to RAN 610 and to data network 641. NFVI hardware 701 executes NFVI hardware drivers 702, NFVI operating systems 703, NFVI virtual layer 704, and NFVI VNFs 705 to form AMF 621, SMF 622, UPF 623, UDM 624, PCF 625, P-CSCF 631, I-CSCF 632, S-CSCF 633, TAS 634, RCS AS 635.

Figure 8:
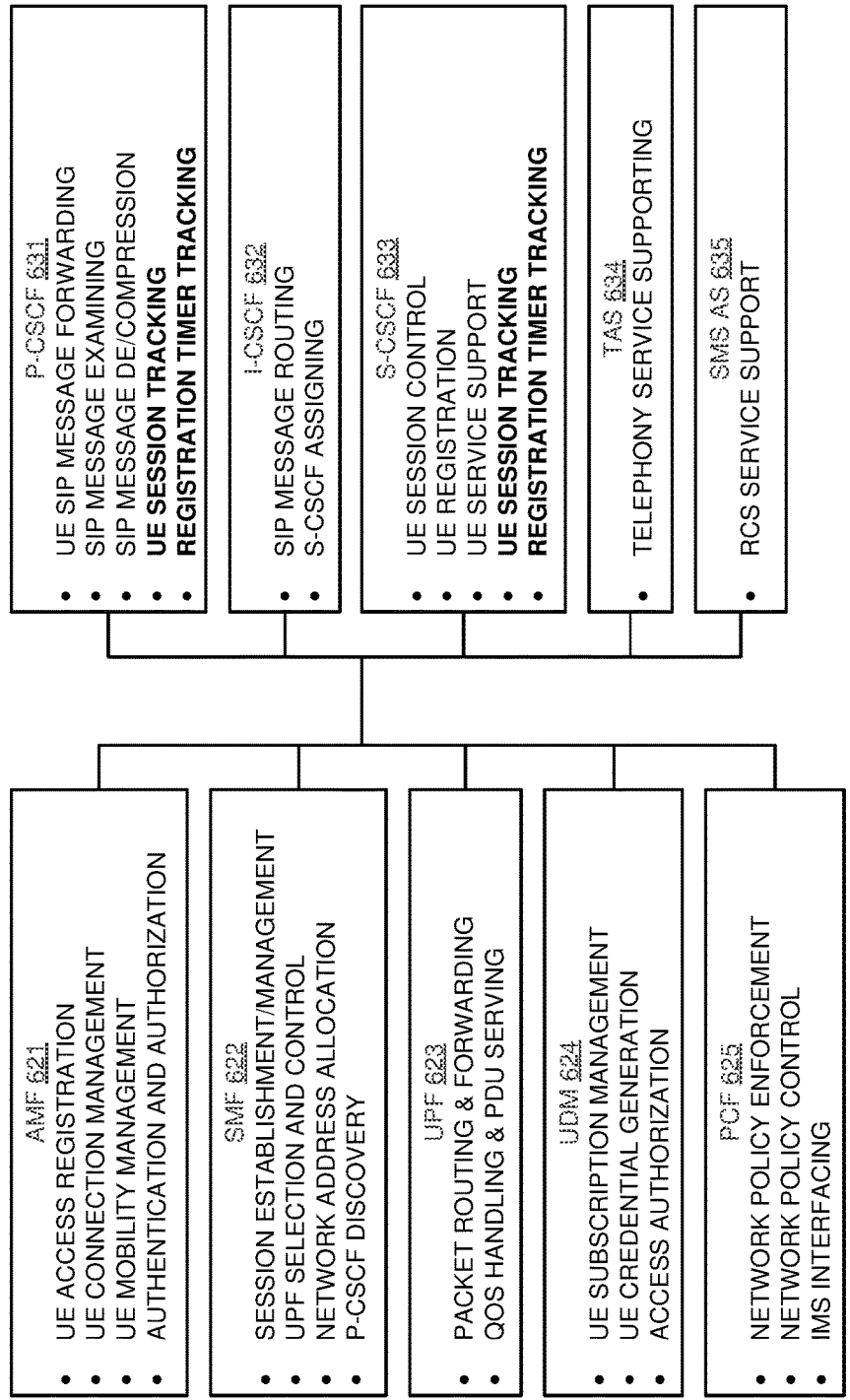
FIG. 8 further illustrates the NFVI in the 5G wireless communication network.

FIG. 8 further illustrates NFVI 700 in 5G communication network 600. AMF 621 comprises capabilities for UE access registration, UE connection management, UE mobility management, UE authentication, and UE authorization. SMF 622 comprises capabilities for session establishment, session management, UPF selection/control, and network address allocation, and P-CSCF discovery. UPF 623 comprises capabilities for packet routing, packet forwarding, QoS handling, and PDU serving. UDM 624 comprises capabilities for UE subscription management, UE credential generation, and access authorization. PCF 625 comprises capabilities for network policy enforcement, network policy control, and IMS interfacing. P-CSCF 631 comprises capabilities for UE SIP message forwarding. SIP message examining. SIP message compression, SIP message decompression, UE session tracking, and registration timer tracking. I-CSCF 632 comprises capabilities for SIP message routing and S-CSCF assigning. S-CSCF 633 comprises capabilities for UE session control, UE registration, UE service support, UE session tracking, and registration timer tracking. TAS 634 comprises capabilities for telephony service support. RCS AS 635 comprises capabilities for RCS service support.

In some examples, UPF 623 receives an IMS registration request generated by UE 601 over RAN 610 and forwards the request to P-CSCF 631. P-CSCF 631 retrieves the network address for I-CSCF 632 to forward the registration request to I-CSCF 632. I-CSCF 632 interfaces with UDM 624 to identify available S-CSCFs, including S-CSCF 633. I-CSCF 632 selects S-CSCF 633 to register UE 601 transfers the IMS registration request to S-CSCF 633. I-CSCF 632 forwards the IMS registration request to S-CSCF 633. S-CSCF 633 retrieves authentication data from UDM 624 and interfaces with UE 601 to authenticate the identity of UE 601 and authorize UE 601 for IMS services. Upon authentication and authorization, S-CSCF 633 registers UE 601 for IMS service. S-CSCF 633 sets a registration timer for UE 601 based on the registration request and forms IMS UE context. S-CSCF 633 drives P-CSCF 631 to transfer a registration accept message to UE 601 over UPF 623 and RAN 610.

UPF 623 receives an MO IMS video session request generated by MO UE 601 for MT UE 602. UPF 623 associates the session request with P-CSCF 631 and delivers the session request to P-CSCF 631. P-CSCF 631 receives the SIP invite and determines the requested multimedia session type is a video call. P-CSCF 631 transfers the SIP invite to S-CSCF 633. S-CSCF 633 translates the URI for MT UE 602 included in the SIP invite into the IP address for MT UE 602 registered with IMS 630 and replaces the URI for MT UE 602 with the IP address in the SIP invite. S-CSCF 633 returns the SIP invite to P-CSCF 631 based on the registered IP address for MT UE 602 and directs P-CSCF 631 to deliver the SIP invite to MT UE 602. P-CSCF 631 transfers the SIP invite for delivery to MT UE 602 over data network 641.

P-CSCF 631 receives a message from MT UE 602 via data network 641 indicating acceptance for the video session. P-CSCF 631 indicates the acceptance to S-CSCF 633 and transfers the acceptance message for delivery to MO UE 601. S-CSCF 633 directs P-CSCF 631 to create a dedicated bearer for the video session. P-CSCF 631 transfers a dedicated bearer request to PCF 625. PCF 625 receives the request and directs AMF 621 to create a dedicated bearer for the voice call. AMF 621 controls RAN 610 to reserve radio resources for the dedicated bearer. AMF 621 indicates bearer setup is complete to P-CSCF 631 over PCF 625.

P-CSCF 631 informs S-CSCF 633 that bearer setup is complete. S-CSCF 633 interfaces with data network 641 and UPF 623 over P-CSCF 631 to establish and end-to-end RTP connection between MO UE 601 and MT UE 602 to carry the video data for the session. S-CSCF 633 transfers an indication for MO UE 601 that the video session may begin to P-CSCF 631 which delivers the indication to MO UE 601 over UPF 623 and RAN 610. S-CSCF 633 transfers another indication for MT UE 602 that the voice session may begin to P-CSCF 631. P-CSCF 631 delivers the indication to MT UE 602 over data network 641. In response to the indication, MT UE 602 rings its user to notify them of the requested video call. When the user of MT UE 602 answers the call, MT UE 602 transfers an answer indication to P-CSCF 631 which forwards the answer indication to MO UE 601 over UPF 623 and RAN 610. MO UE 601 acknowledges the answer indication to MT UE 602 to signify that the voice call may enter conversation mode.

MT UE 602 generates and transfers user data for the video session to data network 641. Data network 641 transfers user data to UPF 623. UPF 623 transfers the user data to RAN 610. RAN 610 wirelessly delivers the downlink user data to MO UE 601. MO UE 601 generates additional user data and transfers the additional user data as uplink to RAN 610. RAN 610 transfers the additional user data to UPF 623. UPF 623 routes the additional user data to data network 641 which delivers the user data to MT UE 602. Subsequently, UE 601 ends the IMS video call. UPF 623 receives a call end notification generated by UE 601 and delivers the notification to P-CSCF 631. P-CSCF 631 informs S-CSCF 633 that UE 601 is no longer in an active media session.

After the IMS video call between MO UE 601 and MT UE 602 has ended, UE 601 detects that the registration timer is set to expire and transfers an IMS registration refresh request addressed to P-CSCF 631 to RAN 610. However, an error occurs in RAN 610 preventing delivery of the registration refresh request to IMS core 630. As a result, P-CSCF 631 does not receive the registration refresh request and the registration timer expires. S-CSCF 633 and P-CSCF 631 detect the expiration of the registration timer for UE 601. Prior to initiating a force deregistration, S-CSCF 633 determines if UE 601 is participating in an active IMS session. Since UE 601 is no longer in an active IMS session, S-CSCF 633 decides to immediately deregister UE 601. S-CSCF 633 clears UE 601's IMS context to deregister UE 630 and directs P-CSCF 631 to deregister UE 631. P-CSCF 631 discards the UE IMS context and transfers a deregistration command to UE 601 over UPF 623 and RAN 610.

Figure 9:
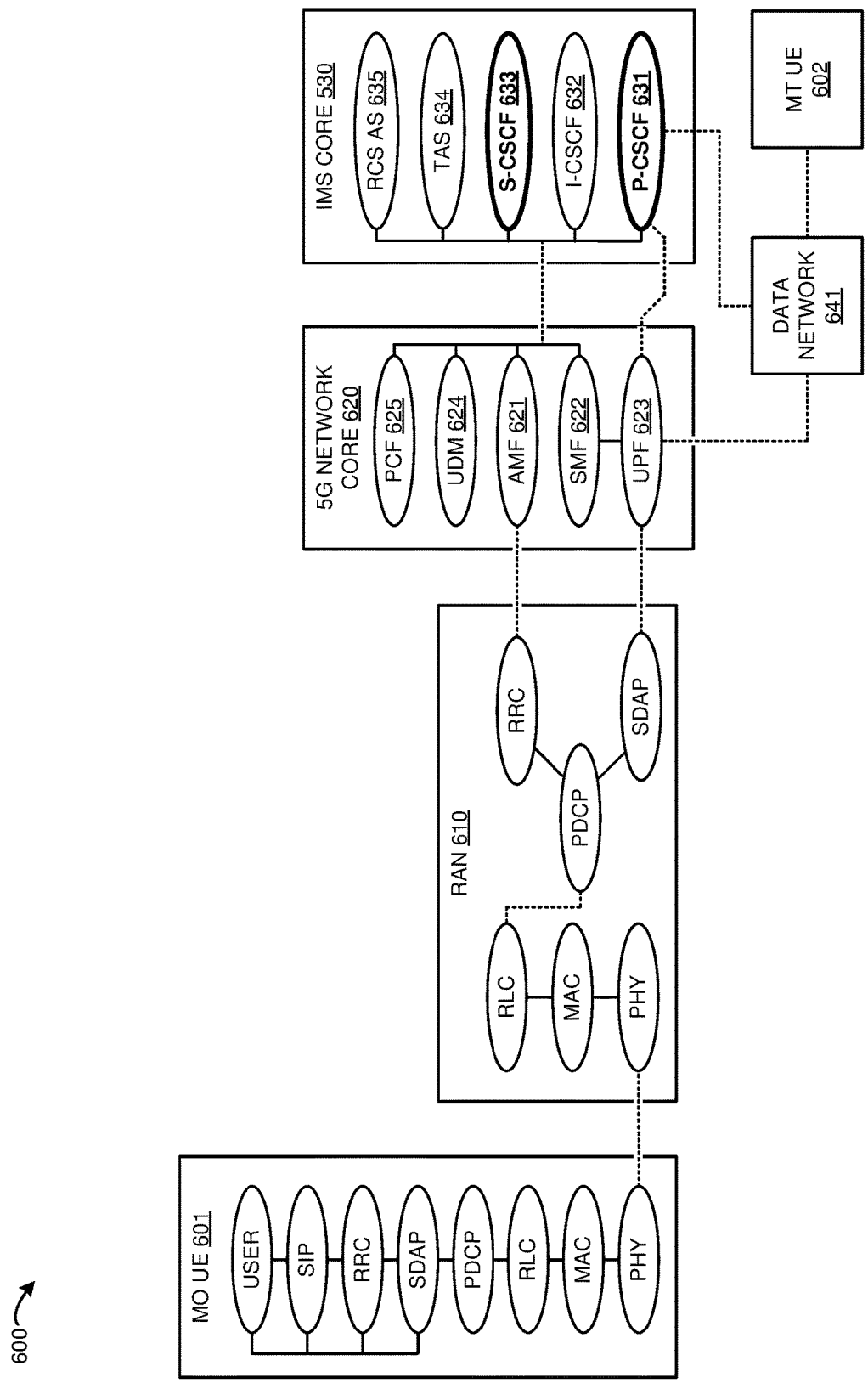
FIG. 9 illustrates an exemplary operation of the 5G wireless communication network to inhibit premature IMS deregistration in response to registration timer expiration.

FIG. 9 illustrates an exemplary operation of 5G communication network 600 to inhibit premature IMS deregistration in response to registration timer expiration. The operation may vary in other examples. MO UE 601 hosts user applications (USER) and 5GNR network applications for Physical Layer (PHY), Media Access Control (MAC), Radio Link Control (RLC), Packet Data Convergence Protocol (PDCP), Service Data Adaptation Protocol (SDAP), Radio Resource Control (RRC), and Session Initiation Protocol (SIP). RAN 610 hosts network applications for PHY, MAC, RLC, PDCP. SDAP, and RRC. UE 601 and RAN 610 execute their respective network applications to facilitate wireless signaling and data exchange.

In some examples, UE 601 wirelessly attaches to RAN 610 and the RRC in UE 601 exchanges attachment signaling with the RRC in RAN 610 over the PDCPs, RLCs, MACs, and PHYs to establish a default radio signaling bearer. Once the signaling bearer is established, the RRC in UE 601 transfers a registration request for network core 620 to the RRC in RAN 610 over the PDCPs, RLCs, MACs, and PHYs. The RRC in RAN 610 forwards the registration request to AMF 621. AMF 621 transfers an identity request for UE 601 to the RRC in RAN 610. The RRC in RAN 610 forwards the identity request to the RRC in UE 601 over the PDCPs, RLCs, MACs, and PHYs. The RRC in UE 601 indicates the identity of UE 601 to the RRC in RAN 610 over the PDCPs, RLCs, MACs, and PHYs. Exemplary identity indications comprise Subscriber Concealed Identifier (SUCI) and Subscriber Permanent Identifier (SUPI). The RRC in RAN 610 forwards the identity indication to AMF 621. AMF 621 interacts with the other network functions to authenticate and authorize UE 601 for wireless data service.

Responsive to the authentication and authorization, AMF 621 retrieves service metrics for MO UE 601 from UDM 624 and selects a network slice for UE 601. The UDM pulls the requested data from a subscriber profile for UE 601 and transfers the data to AMF 621. AMF 621 selects SMF 622 to serve UE 601 based on the service metrics. SMF 622 selects P-CSCF 631 and UPF 623 based on the service metrics and network slice. SMF 622 indicates the network addresses for UPF 623 and P-CSCF 631 to AMF 621. AMF 621 generates UE context comprising the slice ID, the network addresses, the service attributes, and the like. AMF 621 transfers the UE context to the RRC in RAN 610. The RRC in RAN 610 transfers the UE context to the RRC in UE 601 over the PDCPs, RLCs, MACs, and PHYs.

Responsive to network registration, UE 601 initiates an IMS registration procedure to register with IMS core 630. The RRC in UE 601 drives the SIP application to generate a SIP registration message that includes a registration time indication. The SDAP in UE 601 addresses the SIP registration message using the network address for P-CSCF 631 in the UE context. The SDAP transfers the SIP registration message to the SDAP in RAN 610 over the PDCPs, RLCs, MACs, and PHYs. The SDAP in RAN 610 transfers the SIP registration message to UPF 623. UPF 623 transfers the SIP registration to P-CSCF 631 using the network address for P-CSCF 631.

P-CSCF 631 receives the registration request and retrieves the network address for I-CSCF 632 using a DNS query. P-CSCF 631 forwards the registration request to I-CSCF 632. I-CSCF 632 requests S-CSCF selection criteria from UDM 624. UDM 624 identifies available S-CSCFs in IMS core 630, including S-CSCF 633. I-CSCF 632 selects S-CSCF 633 to register UE 601 and forwards the registration request to S-CSCF 633. S-CSCF 633 retrieves user authentication data like random numbers, authentication tokens, signed results, and secret keys from UDM 624. S-CSCF 633 uses the retrieved authentication data to verify the identity of UE 601 before registering UE 601 for IMS service. S-CSCF 633 exchanges registration signaling for UE 601 with P-CSCF 631. P-CSCF 631 and exchanges the registration signaling with UDM 624. UDM 624 exchanges the registration signaling with the SDAP in RAN 610. The SDAP in RAN 610 exchanges the registration signaling with the SDAP in UE 601 over the PDCPs, RLCs, MACs, and PHYs. SDAP indicates the registration signaling to the RRC in UE 601. Upon authentication, S-CSCF 633 registers UE 601 for IMS services and sets a registration timer for UE 601. P-CSCF 631 also sets a registration timer for UE 601.

Once registered with IMS core 630, a user application in UE 601 executes to initiate an RCS instant messaging session with UE 602. The user application drives the SIP application to generate an MO SIP invite for UE 602. The SIP application generates the SIP invite and includes the phone number for UE 602 in the invite. The SIP application transfers the invite to the RRC which directs the SDAP to transfer the SIP invite to IMS core 630 to request the instant messaging session. The SDAP in UE 601 transfers the SIP invite to the SDAP in RAN 610 over the PDCPs, RLCs, MACs, and PHYs along the default radio data bearer. The SDAP in RAN 610 forwards the SIP invite to P-CSCF 631 over UPF 623. P-CSCF 631 receives the SIP invite and examines the SIP invite to determine that the requested session type is an RCS session. P-CSCF 631 caches the session type in memory and transfers the SIP invite to S-CSCF 633. S-CSCF 633 translates phone number for MT UE 602 included in the SIP invite into the registered IP address for MT UE 602. S-CSCF 633 replaces the phone number for MT UE 602 with the IP address in the SIP invite and returns the SIP invite to P-CSCF 631. P-CSCF 631 transfers the SIP invite for delivery to MT UE 602 over data network 641.

MT UE 602 accepts the MO SIP invite to participate in the RCS session with MO UE 601. MT UE 602 indicates the acceptance to P-CSCF 631 over data network 641. P-CSCF 631 notifies S-CSCF 633 of the acceptance and transfers the acceptance message to the SDAP in RAN 610 over UPF 623. The SDAP in RAN 610 transfers the acceptance message to the SDAP in UE 601 over the PDCPs, RLCs, MACs, and PHYs using the default data radio bearer. S-CSCF 633 directs RCS AS 635 to support the instant messaging session and directs P-CSCF 631 to request the dedicated bearer for the instant messaging session. P-CSCF 631 transfers a dedicated bearer request for UE 601 to PCF 625 over their N5 interface.

PCF 625 receives the request and directs AMF 621 to reserve the requested radio resources to create the dedicated bearer for UE 601. AMF 621 transfers a bearer setup command to the RRC in RAN 610 to allocate radio resources to form the dedicated data radio bearer for UE 601. The RRC in RAN 610 reserves the needed radio resources to form the dedicated radio data bearer for UE 601 notifies AMF 621. AMF 621 indicates the bearer setup is complete to PCF 625. PCF 625 notifies P-CSCF 631 over their N5 interface.

P-CSCF 631 informs S-CSCF 633 that bearer setup is complete. S-CSCF 633 interfaces with data network 641 and UPF 623 over P-CSCF 631 to establish and end-to-end RTP connection between MO UE 601 and MT UE 602 to carry the user data for the instant messaging session. S-CSCF 633 transfers an indication for MO UE 601 that the RCS session may begin to P-CSCF 631. P-CSCF 631 delivers the indication to the SDAP in RAN 610 over UPF 623. The SDAP in RAN 610 transfers the indication to SDAP in UE 610 over the PDCPs, RLCs, MACs, and PHYs. S-CSCF 633 transfers another indication for MT UE 602 that the instant messaging session may begin to P-CSCF 631. P-CSCF 631 delivers the indication to MT UE 602 over data network 641. MT UE 602 receives the indication and rings its user to notify them of the RCS session. When the user of MT UE 602 answers the RCS session request, MT UE 602 transfers an answer indication to P-CSCF 631 which forwards the answer indication to the SDAP in RAN 610 over UPF 623. The SDAP in RAN 610 delivers the answer indication to SDAP in MO UE 601 over the PDCPs, RLCs, MACs, and PHYs. SDAP in MO UE 601 acknowledges the answer indication to MT UE 602 to signify that the instant messaging session may enter chat mode.

MT UE 602 generates and transfers user data for the RCS session to data network 641. Data network 641 transfers user data to UPF 623. UPF 623 transfers the user data over the to the SDAP in RAN 610. The SDAP in RAN 610 delivers the downlink user data over the PDCPs, RLCs, MACs, and PHYs to SDAP in MO UE 601. The user application in MO UE 601 generates additional user and SDAP transfers the additional user data as uplink over the PDCPs, RLCs, MACs, and PHYs to the SDAP in RAN 610. The SDAP in RAN 610 transfers the additional user data to UPF 623. UPF 623 routes the additional user data to data network 641 which delivers the user data to MT UE 602. RCS AS 635 supports the data exchange for the RCS session between UEs 601 and 602.

S-CSCF 633 and P-CSCF 631 monitor the session status and registration timer for UE 601. During the RCS session between MO UE 601 and MT UE 602, the RRC in UE 601 detects IMS registration expiration is imminent and drives the SIP application to generate a registration refresh request. The SIP generates the registration refresh request and the SDAP in UE 601 transfers the registration refresh request to the SDAP in RAN 610 over the PDCPs, RLCs, MACs, and PHYs. The SDAP in RAN 610 forwards the registration refresh request to UPF 623. However, an error occurs in UPF 623 causing the registration refresh request to be lost. Consequently, the registration timer for UE 601 expires without P-CSCF 631 receiving a registration refresh request for UE 601.

S-CSCF 633 and P-CSCF 631 detect the expiration of the registration timer for UE 601. Prior to initiating a force deregistration, S-CSCF 633 determines if UE 601 is participating in an active IMS session. Since UE 601 is in an RCS session with UE 602, S-CSCF 633 decides to temporarily maintain the registration status of UE 601 and informs P-CSCF 631. P-CSCF 631 copies the previous session context for UE 601 to preserve UE 601's IMS registration. Subsequently, UE 602 ends the RCS session and transfers a session end notification to P-CSCF 631 over data network 641. P-CSCF 631 forwards the notification to S-CSCF 633. S-CSCF 633 determines that UE 601 is no longer participating in an IMS session and that the IMS registration for UE 601 is expired. In response, S-CSCF 633 clears UE 601's IMS context to deregister UE 630 and directs P-CSCF 631 to deregister UE 631. P-CSCF 631 discards the replica of the UE IMS context and transfers a deregistration command for UE 601 to UPF 623. UPF 623 transfers the deregistration command to the SDAP in RAN 610. The SDAP in RAN 610 transfers the deregistration command to the SDAP in UE 601 over the PDCPs, RLCs, MACs, and PHYs. The SDAP in UE 601 informs the RRC in UE 601 of the IMS deregistration command. In response, the RRC deregisters UE 601 for IMS service.

The wireless data network circuitry described above comprises computer hardware and software that form special-purpose network circuitry to inhibit multimedia session drop in response to registration timer expiration. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to inhibit multimedia session drop in response to registration timer expiration.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method of operating a wireless communication network to inhibit multimedia session drop, the method comprising:
   receiving a multimedia registration request from a user device that comprises a registration timer indication;
   registering the user device for multimedia services and setting a registration timer based on the registration timer indication;
   receiving a multimedia session request from the user device and establishing a multimedia session based on the session request;
   determining when the registration timer expires and when the multimedia session is active;
   when the registration timer expires and the multimedia session is active, maintaining the registration of the user device, wherein the user device does not successfully transfer a registration refresh request to maintain the registration; and
   when the registration timer expires and the multimedia session is inactive, deregistering the user device.

2. The method of claim 1 wherein maintaining the registration of the user device comprises maintaining a replica of a preexisting user device context and ignoring the registration timer expiration when the multimedia session is active.

3. The method of claim 1 wherein the multimedia registration request comprises an Internet Protocol Multimedia Subsystem (IMS) registration request.

4. The method of claim 1 wherein the multimedia session request comprises a Mobile Originating Session Initiation Protocol (MO SIP) invite.

5. The method of claim 1 wherein the requested multimedia session comprises an instant messaging session.

6. The method of claim 1 wherein the requested multimedia session comprises a voice call.

7. The method of claim 1 wherein the requested multimedia session comprises a video call.

8. A wireless communication network to inhibit multimedia session drop, the wireless communication network comprising:
   Call Session Control Function (CSCF) circuitry that:
      receives a multimedia registration request from a user device that comprises a registration timer indication;
      registers the user device for multimedia services and sets a registration timer based on the registration timer indication;
      receives a multimedia session request from the user device and establishes a multimedia session based on the session request;
      determines when the registration timer expires and when the multimedia session is active;
      maintains the registration of the user device when the registration timer expires and the multimedia session is active, wherein the CSCF circuitry does not receive a registration refresh request for the user device to maintain the registration; and
      deregisters the user device when the registration timer expires and the multimedia session is inactive.

9. The wireless communication network of claim 8 wherein the CSCF circuitry further maintains a replica of a preexisting user device context and ignores the registration timer expiration when the multimedia session is active.

10. The wireless communication network of claim 8 wherein the multimedia registration request comprises an Internet Protocol Multimedia Subsystem (IMS) registration request.

11. The wireless communication network of claim 8 wherein the multimedia session request comprises a Mobile Originating Session Initiation Protocol (MO SIP) invite.

12. The wireless communication network of claim 8 wherein the requested multimedia session comprises an instant messaging session.

13. The wireless communication network of claim 8 wherein the requested multimedia session comprises a voice call.

14. The wireless communication network of claim 8 wherein the requested multimedia session comprises a video call.

15. One or more non-transitory computer-readable storage media having program instructions stored thereon to inhibit multimedia session drop, wherein the program instructions, when executed by a computing system, direct the computing system to perform operations, the operations comprising:
   receiving a multimedia registration request from a user device that comprises a registration timer indication;
   registering the user device for multimedia services and setting a registration timer based on the registration timer indication;
   receiving a multimedia session request from the user device and establishing a multimedia session based on the session request;
   determining when the registration timer expires and when the multimedia session is active;
   when the registration timer expires and the multimedia session is active, maintaining the registration of the user device, wherein the user device does not successfully transfer a registration refresh request to maintain the registration; and
   when the registration timer expires and the multimedia session is inactive, deregistering the user device.

16. The non-transitory computer-readable storage media of claim 15 wherein maintaining the registration of the user device comprises maintaining a replica of a preexisting user device context and ignoring the registration timer expiration when the multimedia session is active.

17. The non-transitory computer-readable storage media of claim 15 wherein the multimedia registration request comprises an Internet Protocol Multimedia Subsystem (IMS) registration request.

18. The non-transitory computer-readable storage media of claim 15 wherein the multimedia session request comprises a Mobile Originating Session Initiation Protocol (MO SIP) invite.

19. The non-transitory computer-readable storage media of claim 15 wherein the requested multimedia session comprises a voice call.

20. The non-transitory computer-readable storage media of claim 15 wherein the requested multimedia session comprises a video call.

* * * * *